(12) United States Patent
Dolenc

(10) Patent No.: US 11,542,911 B2
(45) Date of Patent: Jan. 3, 2023

(54) APPARATUS FOR CONVERTING THE ENERGY OF OCEAN WAVES

(71) Applicant: Theodore Dolenc, Saratoga Springs, UT (US)

(72) Inventor: Theodore Dolenc, Saratoga Springs, UT (US)

(*) Notice: Subject to any disclaimer, the term of this patent is extended or adjusted under 35 U.S.C. 154(b) by 0 days.

(21) Appl. No.: 17/249,987

(22) Filed: Mar. 19, 2021

(65) Prior Publication Data

US 2022/0299004 A1 Sep. 22, 2022

(51) Int. Cl.
*F03B 13/18* (2006.01)

(52) U.S. Cl.
CPC ...... *F03B 13/1825* (2013.01); *F05B 2240/50* (2013.01); *F05B 2250/25* (2013.01)

(58) Field of Classification Search
CPC .................................................. F05B 2250/25
USPC ........................................ 290/42, 43, 53, 54
See application file for complete search history.

(56) References Cited

U.S. PATENT DOCUMENTS

| | | | | |
|---|---|---|---|---|
| 4,500,259 A * | 2/1985 | Schumacher | ........... | F03D 3/061 416/122 |
| 4,708,592 A * | 11/1987 | Krolick | ................... | F03D 80/70 416/176 |
| 4,849,647 A * | 7/1989 | McKenzie | ............ | F03B 17/061 417/334 |
| 5,451,137 A * | 9/1995 | Gorlov | .................... | F03D 13/20 415/75 |
| 7,849,596 B2 * | 12/2010 | Sauer | ....................... | B26D 3/11 29/889.7 |
| 8,961,131 B2 * | 2/2015 | Trayner | ............... | F03B 17/061 416/9 |
| 2006/0257241 A1 * | 11/2006 | Eielsen | ................. | F03D 1/0633 415/71 |

(Continued)

FOREIGN PATENT DOCUMENTS

| | | | | |
|---|---|---|---|---|
| CA | 2694150 A1 * | 8/2011 | ............... | F03B 3/04 |
| CN | 110575948 A | 12/2019 | | |

(Continued)

OTHER PUBLICATIONS

International Search Report and Written Opinion received for PCT Patent Application No. PCT/2022/012509, dated May 12, 2022.

*Primary Examiner* — Charles Reid, Jr.
(74) *Attorney, Agent, or Firm* — Lowenstein Sandler LLP

(57) ABSTRACT

A wave energy converter apparatus includes a platform that is configured to float below an upper liquid surface of a liquid responsive to the wave energy converter apparatus being disposed in the liquid. The wave energy converter apparatus further includes support structures mounted to an upper platform surface of the platform. The wave energy converter apparatus further includes a supporting shaft coupled to the support structures, the supporting shaft being disposed along an axis. The supporting shaft is configured to be oriented with the axis substantially perpendicular to direction of waves of the liquid. The wave energy converter apparatus further includes a helical member rotatably coupled to the supporting shaft and configured to rotate about the axis. The wave energy converter apparatus further includes an electrical rotary generator coupled to the helical member. The electrical rotary generator is configured to generate electricity responsive to rotation of the helical member.

19 Claims, 2 Drawing Sheets

(56) References Cited

U.S. PATENT DOCUMENTS

2009/0022597 A1* 1/2009 Bowie .................. F03B 17/061
                                                                  416/223 R

FOREIGN PATENT DOCUMENTS

| CN | 112761855 A | | 5/2021 | |
|----|-------------|---|--------|---|
| GB | 2057584 A | * | 4/1981 | ............... F03D 3/02 |
| WO | WO-9638667 A1 | * | 12/1996 | ............ F03B 17/061 |
| WO | WO-2012019307 A1 | * | 2/2012 | ............... E02B 9/08 |
| WO | 2020261240 A1 | | 12/2020 | |

* cited by examiner

APPARATUS FOR CONVERTING THE ENERGY OF OCEAN WAVES

DETAILED DESCRIPTION

Figure 1:
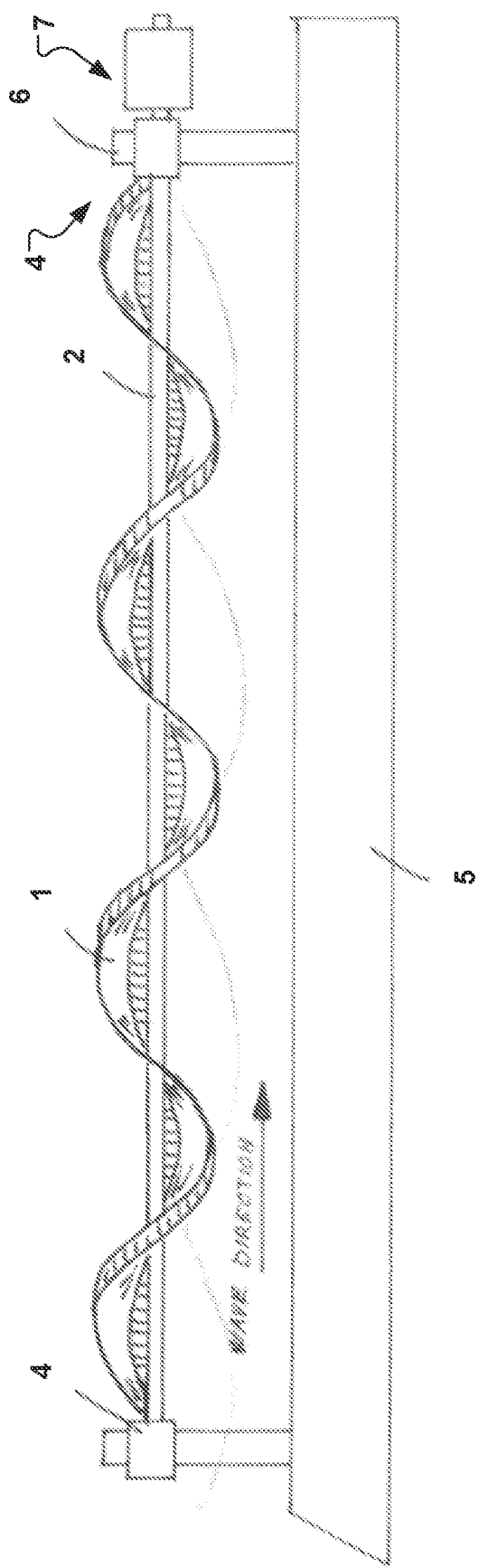
FIG. 1 illustrates a front view of a wave energy converter apparatus, according to certain embodiments.

In some embodiments, the present disclosure includes adaptations of a machine engine for special use. In some embodiments, the present disclosure includes a machine or engine with driving or driven apparatus. In some embodiments, the present disclosure includes a power station or aggregate that uses wave energy using the relative movement between a wave-operated member (WOM) and another member (e.g., reaction member (REM), where the other member (e.g., REM) is fixed, at multiple points, with respect to the sea bed or shore.

In some embodiments, the present disclosure includes an apparatus configured to convert the energy of surface waves in a liquid such as an ocean. The apparatus may include a helical member mounted for rotation about an axis. The pitch of the helical member approximates 45 degrees the surface with the axis oriented so that each wave traverses the helical member lengthwise and supports successive sections thereof causing the helical member to rotate about the axis. The helical member is coupled with rotary driven means such as an electrical generator.

The present disclosure is configured to convert the energy of ocean waves into useful power. In some embodiments, the present disclosure includes an apparatus adapted to be rotated by ocean waves.

A tremendous and inexhaustible source of energy is to be found in wind-driven, solar, hydro, and ocean waves and innumerable attempts have been made to convert this energy to a useful form. In many sections of the world, such as the west coast of North America, waves approach the coast with great regularity and without interruption over extended periods of time. The present disclosure is directed to an apparatus for converting the available wave energy to a more useful form, such as electricity. Waves in water may be termed "gravity waves" and while the waves move horizontally at substantial speeds (e.g., 30 knots) the motion of the water itself may be circular or elliptical, except when the wave breaks. Wave energy conversion systems employed heretofore have utilized the vertical component of the water motion and/or water movement associated with breaking waves. Such systems are intermittent in their operation and/or have variable energy outputs.

Another characteristic of ocean waves is their period or wavelength which, over extended periods of time, may, in many locations, deviate only slightly from a particular value. This is significant because it has made possible the achievement of an Objective of the present disclosure, namely, the provision of a wave energy converter apparatus adapted to operate continuously and provide a continuous and substantially constant energy output. This is achieved by virtue of a novel and improved construction that continuous horizontal motion of the wave itself.

To affect the foregoing and other objectives, the present disclosure includes a helical member mounted for rotation about an axis (e.g., its helical axis) and adapted to be positioned such that the helical axis is oriented perpendicular to the waves. The helical member is coupled to a driven system, such as an electrical generator.

The present disclosure includes the apparatus possessing the construction, combination of elements and arrangement of parts, which are exemplified in the present disclosure, and the scope of the application of which will be indicated in the claims.

FIG. 1 is a schematic in elevational view of the submerged floating platform 5 in section, and partially in perspective, illustrating a wave energy converter apparatus, according to certain embodiments.

As illustrated in FIG. 1, the wave energy converter apparatus may include a helical member 1, a supporting shaft 2, a waterproof bearings member 4, a platform 5, and mounted metal pillars 6. In some embodiments, the helical member 1 is substantially uniform throughout its length. In some embodiments, the helical member 1 has an enabling mounted member in said liquid with said axis substantially in the plane of the mean level of said liquid (e.g., wherein the axis is substantially parallel to an upper platform surface of the platform 5). In some embodiments, wave energy converter apparatus includes mounted metal pillars 6 such that in a calm body of said liquid approximately half of said member is submerged and half of said member extends above the surface of said liquid. In some embodiments, the cross section of said helical member 1 is substantially uniform throughout its entire length. In some embodiments, the helical member 1 is supported via mounting waterproof bearings member 4 with the helical axes all in substantially in lined relation. In some embodiments, the helical member 1 is submerged and half of the helical member 1 extends above the surface of said liquid.

Figure 2:
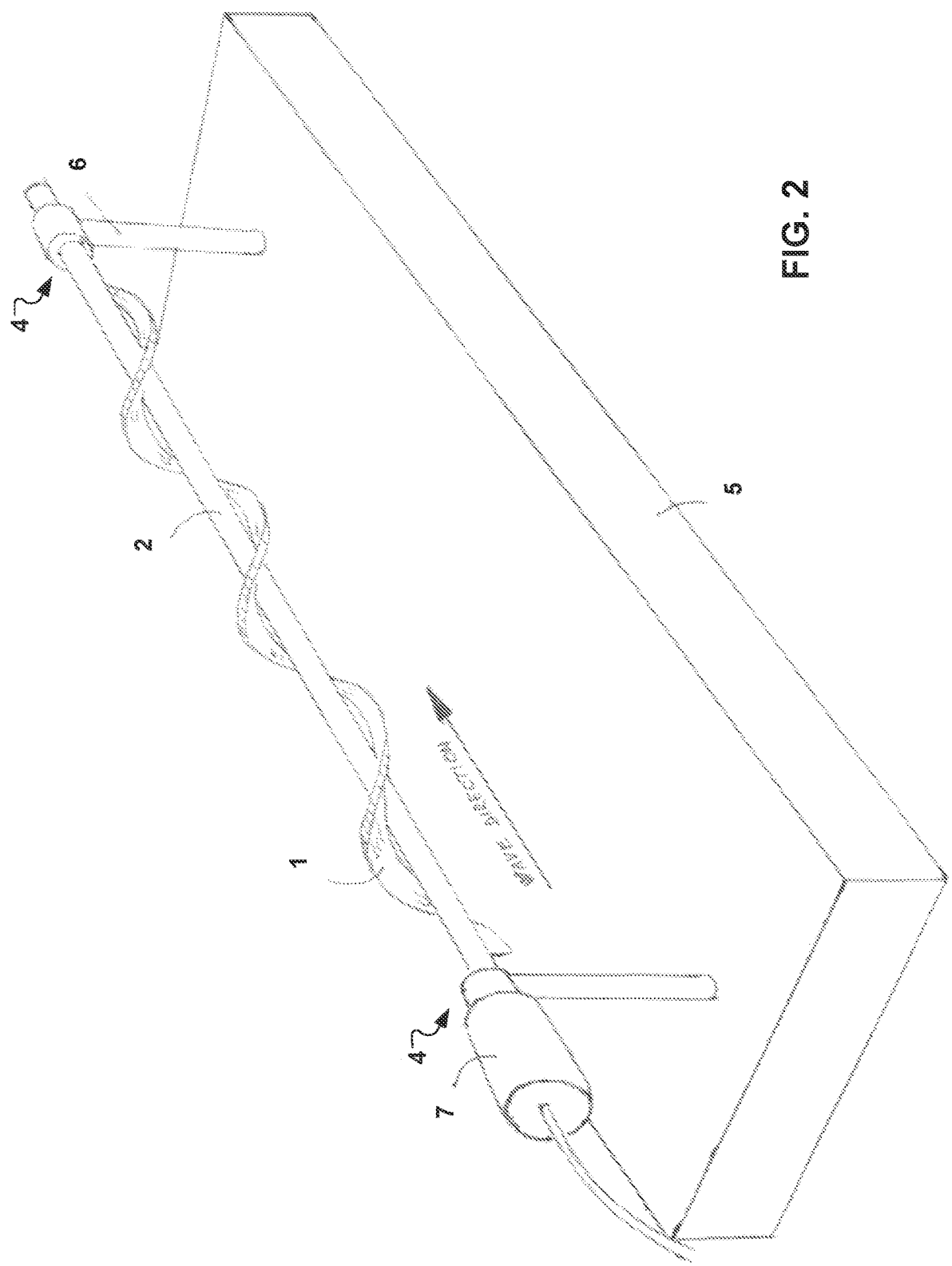
FIG. 2 illustrates a perspective view of a wave energy converter apparatus, according to certain embodiments.

FIG. 2 illustrates a perspective view of a helical member 1 mounted on a submerged floating platform 5 adapted for incorporation in the apparatus of the present disclosure, according to certain embodiments. FIG. 2 illustrates the wave direction associated with ocean waves pushing the helical member 1 to rotate above submerged platform 5 connected to a generator 7 and creating electricity.

The wave energy converter of the present disclosure is shown in the FIGS. as including means adapted to be rotated directly by ocean waves and power conversion means (e.g., generator 7, such as an electrical generator, in FIG. 2 coupled with the wave rotated means and adapted to be driven thereby). The rotary, wave-driven means includes a helical member 1 (e.g., an elongated member in the form of a helix) mounted for rotation about the axis of the helix. Helical member 1 is constructed so as to displace entire portion of volume of the helical member 1 and may include, for example, a tube or it may be formed of a material such as, reinforced fiberglass having a relatively low specific gravity. Helical member 1 is supported with waterproof bearings member 4 (e.g., water proof sealed bearings member) and is rotatably mounted at ends of the helical member 1. As shown in FIG. 1, helical member 1 may be coiled around a supporting shaft 2 and may be supported at regular intervals throughout length of the helical member 1.

As previously noted, over extended periods of time, the waves approaching a floating platform 5 may be characterized by a substantially constant period and approach from substantially the same direction. If the period is known or can be predicted accurately, then the wave length and wave velocity are readily computed, being functions of the wave period. For example, it is not unusual to encounter waves having a period of ten seconds which means that the waves travel at a velocity of about 30 knots or 50 feet per second and have a length of the order of five hundred feet. The helical member 1 is designed and permanently mounted on the submerged platform 5 about 2 meters deep and the axis of the helical member 1 is at the surface of the water while oriented with the axis of the helical member 1 in the direction of wave propagation such that, each wave traverses the helical member 1 from end to end supporting successive bearing sections of the helical member 1.

In some embodiments, submerged floating platform 5 and the helical member 1 mounted helix above will operate in any weather condition even if the waves are large during a storm event. In this event, the apparatus will produce even more electric power.

The wave converter is responsive to both the horizontal motion of the waves as well as the vertical motion of the water itself so that rotation and energy output are both continuous and substantially constant even though waves arrive at intervals.

Since certain changes may be made in the above apparatus without departing from the scope of the present disclosure herein involved, it is intended that all matter contained in the above description or shown in the accompanying drawings shall be interpreted as illustrative and not in a limiting sense.

What is claimed is:

1. A wave energy converter apparatus comprising:
    a platform, wherein the platform is configured to float below an upper liquid surface of a liquid responsive to the wave energy converter apparatus being disposed in the liquid, and wherein the platform has an upper platform surface that is disposed above a lower platform surface responsive to the wave energy converter apparatus being disposed in the liquid;
    support structures mounted to the upper platform surface;
    a supporting shaft coupled to the support structures above the upper platform surface, the supporting shaft being disposed along an axis that is substantially parallel to the upper platform surface;
    a helical member rotatably coupled to the supporting shaft, wherein the helical member is configured to rotate about the axis, and wherein a lower portion of the helical member is below a surface of the liquid and an upper portion of the helical member is above the surface of the liquid responsive to the wave energy converter apparatus being disposed in the liquid; and
    an electrical rotary generator coupled to the helical member, wherein the electrical rotary generator is configured to generate electricity responsive to rotation of the helical member.

2. The wave energy converter apparatus of claim 1, wherein the helical member has a pitch of approximately 45 degrees from the axis.

3. The wave energy converter apparatus of claim 1, wherein the helical member comprises a tube.

4. The wave energy converter apparatus of claim 1, wherein the helical member is formed of reinforced fiberglass.

5. The wave energy converter apparatus of claim 1, wherein the helical member is supported with waterproof sealed bearings and rotatably mounted at distal ends to the supporting shaft.

6. The wave energy converter apparatus of claim 1, wherein the helical member is coiled around the supporting shaft and is supported by the supporting shaft at a plurality of locations along length of the helical member.

7. The wave energy converter apparatus of claim 1, wherein the helical member is supported by a plurality of bearing sections.

8. The wave energy converter apparatus of claim 1, wherein the helical member is substantially uniform along length of the supporting shaft.

9. The wave energy converter apparatus of claim 1, wherein the wave energy converter apparatus is configured to float in the liquid with the axis of the supporting shaft disposed substantially along a mean surface level of the liquid and the platform being submerged in the liquid.

10. The wave energy converter apparatus of claim 1, wherein a cross section of the helical member is substantially uniform throughout an entire length of the helical member.

11. The wave energy converter apparatus of claim 1, wherein the helical member is supported by a waterproof bearings member disposed on the supporting shaft.

12. A wave energy converter apparatus comprising:
    a platform, wherein the platform is configured to float below an upper liquid surface of a liquid responsive to the wave energy converter apparatus being disposed in the liquid, and wherein the platform has an upper platform surface that is disposed above a lower platform surface responsive to the wave energy converter apparatus being disposed in the liquid;
    support structures mounted to the upper platform surface, wherein the support structures are metal pillars mounted to the platform, wherein responsive to the liquid being calm and the platform floating in the liquid, approximately a lower half of height of the metal pillars is below a surface of the liquid and approximately an upper half of the height of the metal pillars is above the surface of the liquid;
    a supporting shaft coupled to the support structures above the upper platform surface, the supporting shaft being disposed along an axis that is substantially parallel to the upper platform surface;
    a helical member rotatably coupled to the supporting shaft, wherein the helical member is configured to rotate about the axis; and
    an electrical rotary generator coupled to the helical member, wherein the electrical rotary generator is configured to generate electricity responsive to rotation of the helical member.

13. The wave energy converter apparatus of claim 12, wherein at least one of:
    the helical member has a pitch of approximately 45 degrees from the axis;
    the helical member comprises a tube;
    the helical member is rotatably mounted at distal ends to the supporting shaft;
    the helical member is formed of reinforced fiberglass;
    the helical member is coiled around the supporting shaft and is supported by the supporting shaft at a plurality of locations along length of the helical member;
    the helical member is substantially uniform along length of the supporting shaft; or
    a cross section of the helical member is substantially uniform throughout an entire length of the helical member.

14. The wave energy converter apparatus of claim 12, wherein the helical member is supported by at least one of:
    waterproof sealed bearings;
    a plurality of bearing sections; or
    a waterproof bearings member disposed on the supporting shaft.

15. The wave energy converter apparatus of claim 12, wherein the wave energy converter apparatus is configured to float in the liquid with the axis of the supporting shaft disposed substantially along a mean surface level of the liquid and the platform being submerged in the liquid.

16. A wave energy converter apparatus comprising:
a platform, wherein the platform is configured to float below an upper liquid surface of a liquid responsive to the wave energy converter apparatus being disposed in the liquid, and wherein the platform has an upper platform surface that is disposed above a lower platform surface responsive to the wave energy converter apparatus being disposed in the liquid;
support structures mounted to the upper platform surface;
a supporting shaft coupled to the support structures above the upper platform surface, the supporting shaft being disposed along an axis that is substantially parallel to the upper platform surface;
a helical member rotatably coupled to the supporting shaft, wherein the helical member is configured to rotate about the axis, wherein substantially a lower half of the helical member is submerged in the liquid and substantially an upper half of the helical member extends above a surface of the liquid responsive to the wave energy converter apparatus being disposed in the liquid; and
an electrical rotary generator coupled to the helical member, wherein the electrical rotary generator is configured to generate electricity responsive to rotation of the helical member.

17. The wave energy converter apparatus of claim 16, wherein at least one of:
the helical member has a pitch of approximately 45 degrees from the axis;
the helical member comprises a tube;
the helical member is rotatably mounted at distal ends to the supporting shaft;
the helical member is formed of reinforced fiberglass;
the helical member is coiled around the supporting shaft and is supported by the supporting shaft at a plurality of locations along length of the helical member;
the helical member is substantially uniform along length of the supporting shaft; or
a cross section of the helical member is substantially uniform throughout an entire length of the helical member.

18. The wave energy converter apparatus of claim 16, wherein the helical member is supported by at least one of:
waterproof sealed bearings;
a plurality of bearing sections; or
a waterproof bearings member disposed on the supporting shaft.

19. The wave energy converter apparatus of claim 16, wherein the wave energy converter apparatus is configured to float in the liquid with the axis of the supporting shaft disposed substantially along a mean surface level of the liquid and the platform being submerged in the liquid.

* * * * *